(12) United States Patent　　　　(10) Patent No.: US 12,621,784 B2

Wu　　　　　　　　　　　　　　　(45) Date of Patent: May 5, 2026

(54) INFORMATION TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 306 days.

(21) Appl. No.: 18/478,938

(22) Filed: Sep. 29, 2023

(65) Prior Publication Data

US 2024/0031965 A1　　　Jan. 25, 2024

Related U.S. Application Data

(63) Continuation of application No. PCT/CN2021/084164, filed on Mar. 30, 2021.

(51) Int. Cl.
　　*H04W 56/00*　　　(2009.01)
　　*H04B 7/185*　　　(2006.01)
(52) U.S. Cl.
　　CPC .... *H04W 56/0045* (2013.01); *H04B 7/18519* (2013.01)
(58) Field of Classification Search
　　CPC .......... H04W 56/0035; H04W 56/0045; H04B 7/18513; H04B 7/18519
　　See application file for complete search history.

(56) References Cited

U.S. PATENT DOCUMENTS

| 10,274,604 | B1 | 4/2019 | Liu et al. | |
| 11,233,562 | B1 * | 1/2022 | Montgomery ..... | H04B 7/18517 |
| 12,231,221 | B1 * | 2/2025 | Huang .............. | H04B 7/18541 |
| 2011/0279312 | A1 * | 11/2011 | Thomson ................ | G01S 19/05 342/357.47 |
| 2016/0323800 | A1 | 11/2016 | Ulupinar et al. | |
| 2018/0013484 | A1 * | 1/2018 | Vasavada .............. | H04B 7/195 |
| 2021/0068065 | A1 * | 3/2021 | Wigard .............. | H04W 56/003 |

(Continued)

FOREIGN PATENT DOCUMENTS

| CN | 111182658 | 5/2020 |
| CN | 111342925 | 6/2020 |

(Continued)

OTHER PUBLICATIONS

"3rd Generation Partnership Project; Technical Specification Group Services and System Aspects; Vocabulary for 3GPP Specifications (Release 16)," 3GPP TR 21.905, Jun. 2019, v16.0.0.
Thales, "About the need for Satellite identifier in 3GPP," 3GPP TSG RAN WG2 Meeting #107, R2-1908843, Aug. 2019.

(Continued)

*Primary Examiner* — Bailor C Hsu
(74) *Attorney, Agent, or Firm* — Hodgson Russ LLP

(57) ABSTRACT

The present application relates to an information transmission method, a terminal device, and a network device. The information transmission method comprises: a terminal device receives synchronization assistance information, the synchronization assistance information having a first association relationship with first information; the terminal device is synchronized according to the synchronization assistance information.

15 Claims, 8 Drawing Sheets

200

| The terminal device receives synchronization assistance information, wherein the synchronization assistance information has a first association relationship with first information | S210 |

↓

| The terminal device acquires synchronization according to the synchronization assistance information | S220 |

(56) References Cited

U.S. PATENT DOCUMENTS

| | | | | |
|---|---|---|---|---|
| 2021/0092781 A1* | 3/2021 | Lauridsen | ............. | H04W 24/02 |
| 2023/0164721 A1* | 5/2023 | Tsai | .................. | H04W 56/0005 |
| | | | | 370/350 |
| 2023/0296720 A1* | 9/2023 | Manolakis | ......... | H04B 7/18563 |
| | | | | 455/456.1 |
| 2023/0388944 A1* | 11/2023 | Cui | ........................ | H04W 56/00 |
| 2024/0048227 A1* | 2/2024 | Leng | .................. | H04B 7/18513 |
| 2024/0306077 A1* | 9/2024 | Murugaian | ............. | H04W 4/90 |

FOREIGN PATENT DOCUMENTS

| | | |
|---|---|---|
| CN | 112399548 | 2/2021 |
| WO | 2020092566 | 5/2020 |

OTHER PUBLICATIONS

Mediatek et al., "UE Time and frequency Synchronisation for NR-NTN," 3GPP TSG RAN WG1 Meeting #104e, R1-2100595, Jan. 2021.

WIPO, International Search Report and Written Opinion for PCT/CN2021/084164, Nov. 30, 2021.

Nokia et al., "Report from [Post112-e][153][NTN] Idle mode aspects (Nokia)," 3GPP TSG-RAN WG2 Meeting #113, R2-2100527, Jan. 2021.

Lenovo et al., "Ephemeris data provision in NTN," 3GPP TSG-RAN WG2 Meeting #112 electronic, R2-2009862 (Revision of R2-2007473), Nov. 2020.

EPO, Extended European Search Report for EP Application No. 21933694.8, Apr. 19, 2024.

* cited by examiner

1202

1201

1203

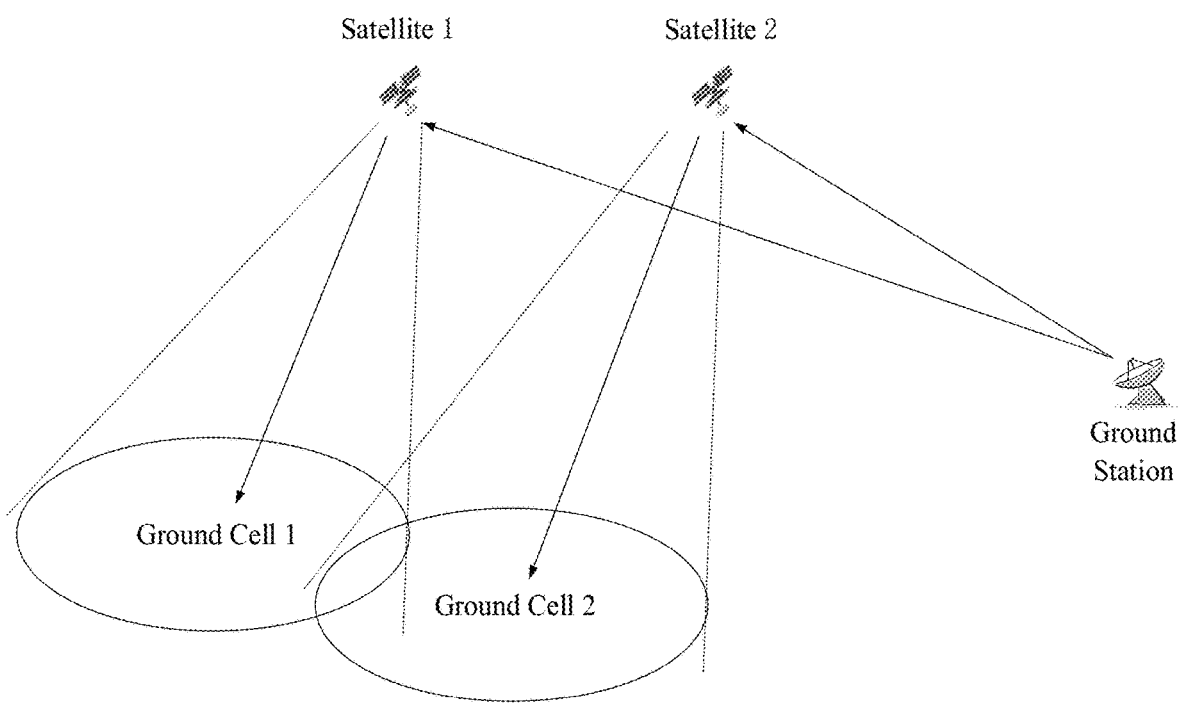

Satellite 1     Satellite 2

Ground
Station

Ground Cell 1

Ground Cell 2

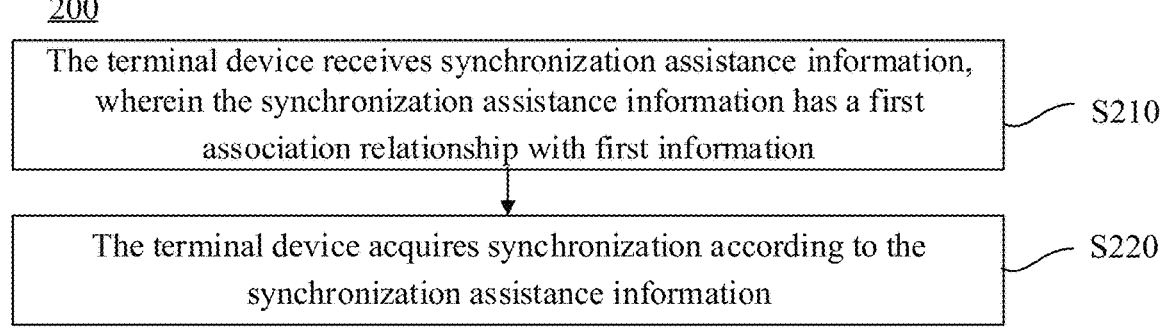

The terminal device receives synchronization assistance information, wherein the synchronization assistance information has a first association relationship with first information — S210

The terminal device acquires synchronization according to the synchronization assistance information — S220

The network device sends synchronization assistance information, wherein the synchronization assistance information has a first association relationship with first information — S310

FIG. 11

INFORMATION TRANSMISSION METHOD, TERMINAL DEVICE, AND NETWORK DEVICE

CROSS REFERENCE

The present application is a continuation of International Application No. PCT/CN2021/084164, filed Mar. 30, 2021, the entire disclosure of which is incorporated herein by reference.

TECHNICAL FIELD

The present disclosure relates to the field of communication, and more specifically, to an information transmission method, a terminal device and a network device.

BACKGROUND

Nowadays, 3GPP is researching Non Terrestrial Network (NTN, non-terrestrial communication network device) technology. NTN generally provides communication services to ground users in the form of satellite communication. Compared with terrestrial cellular network communication, satellite communication has many unique advantages. First of all, satellite communication is not restricted by the user's region. For example, general land communication cannot cover areas such as oceans, mountains, deserts, etc. where communication equipment cannot be set up or the areas where communication coverage is not provided due to sparse population. As for satellite communication, since a satellite can cover a larger ground, and the satellite can orbit around the earth. So theoretically every corner of the earth can be covered by satellite communications. Secondly, satellite communication has great social value. Satellite communication can be covered at a lower cost in remote mountainous areas, poor and backward countries or regions, so that people in these regions can enjoy advanced voice communication and mobile Internet technology, which is conducive to narrowing the digital gap with developed regions and promoting development of these areas. Thirdly, the satellite communication distance is long, and the cost of communication does not increase significantly as the communication distance increases. Finally, satellite communication has high stability and is not limited by natural disasters.

In complex network deployment scenarios, for example, a ground station may relay signals through multiple service satellites to serve multiple ground cells on the ground.

SUMMARY

Embodiments of the present application provide an information transmission method, a terminal device, and a network device.

An embodiment of the present application provides an information transmission method, including:

A terminal device receives synchronization assistance information, wherein the synchronization assistance information has a first association relationship with first information; and The terminal device acquires synchronization according to the synchronization assistance information.

An embodiment of the present application provides an information transmission method, including:

A network device sends synchronization assistance information, wherein the synchronization assistance information has a first association relationship with first information;

wherein the synchronization assistance information is used to enable a terminal device to acquire synchronization.

An embodiment of the present application provides a terminal device, including:

a receiving unit, configured to receive synchronization assistance information, wherein the synchronization assistance information has a first association relationship with first information; and a synchronization unit, configured to acquire synchronization according to the synchronization assistance information.

An embodiment of the present application provides a network device, including:

a sending unit, configured to send synchronization assistance information, wherein the synchronization assistance information has a first association relationship with the first information;

wherein the synchronization assistance information is used to enable a terminal device to acquire synchronization.

An embodiment of the present application provides a terminal device, including a processor and a memory. The memory is used to store a computer program, and the processor is used to call and run the computer program stored in the memory, so that the terminal device executes the above information transmission method.

An embodiment of the present application provides a network device, including a processor and a memory. The memory is used to store a computer program, and the processor is used to invoke and run the computer program stored in the memory, so that the network device executes the above information transmission method.

An embodiment of the present application provides a chip configured to implement the above information transmission method.

Specifically, the chip includes: a processor, configured to call and run a computer program from the memory, so that the device installed with the chip executes the above-mentioned information transmission method.

An embodiment of the present application provides a computer-readable storage medium for storing a computer program, and when the computer program is run by a device, the device is made to execute the above information transmission method.

An embodiment of the present application provides a computer program product, including computer program instructions, wherein the computer program instructions cause a computer to execute the above information transmission method.

An embodiment of the present application provides a computer program that, when running on a computer, causes the computer to execute the above information transmission method.

BRIEF DESCRIPTION OF THE DRAWINGS

FIG. 9 is a schematic diagram of a scenario in which a ground station serves a terminal device through multiple satellites in the NTN system.

FIG. 10 is a schematic flowchart of an information transmission method according to an embodiment of the present application.

FIG. 11 is a schematic flowchart of an information transmission method according to another embodiment of the present application.

DETAILED DESCRIPTION

Hereinafter, technical solutions in the embodiments of the present application will be described with reference to the drawings in the embodiments of the present application.

Figure 1:
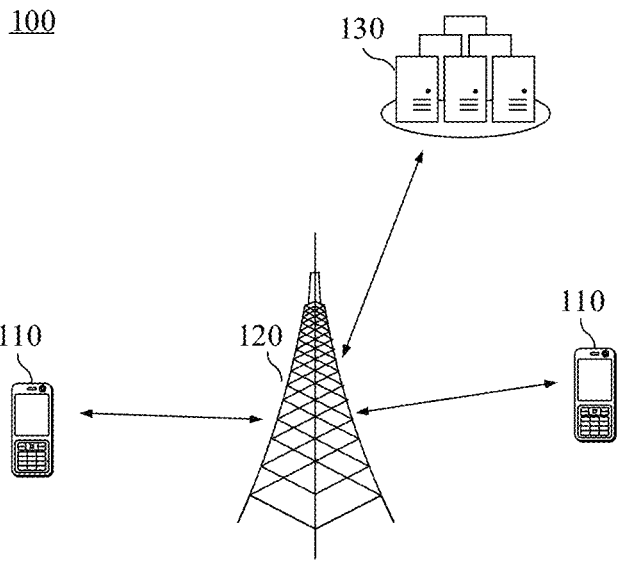
FIG. 1 is a schematic diagram of an application scenario of an embodiment of the present application.

FIG. 1 is a schematic diagram of an application scenario of an embodiment of the present application.

As shown in FIG. 1, a communication system 100 may include a terminal device 110 and a network device 120. The network device 120 may communicate with the terminal device 110 through an air interface. Multi-service transmission is supported between the terminal device 110 and the network device 120.

It should be understood that the embodiment of the present application is only described by using the communication system 100 as an example, but the embodiment of the present application is not limited thereto. That is to say, the technical solution of the embodiment of the present application can be applied to various communication systems, such as: long term evolution (LTE) system, LTE time division duplex (TDD), universal mobile communication system (UMTS), internet of things (IoT) system, narrow band internet of things (NB-IoT) system, enhanced machine-type communications (eMTC) system, 5G communication system (also known as New Radio (NR) communication system), or future communication systems, etc.

In the communication system 100 shown in FIG. 1, the network device 120 may be an access network device that communicates with the terminal device 110. The access network device may provide communication coverage for a specific geographic area, and may communicate with the terminal device 110 (such as UE) located in the coverage area.

The network device 120 may be an evolved base station (Evolutional Node B, eNB or eNodeB) in a long term evolution (LTE) system, or a next-generation radio access network (NG RAN) device, or a base station (gNB) in an NR system, or a wireless controller in a cloud radio access network (CRAN), or the network device 120 can be a relay station, an access point, a vehicle device, a wearable device, a hub, a switch, a bridge, a router, or a network device in the future evolution of the Public Land Mobile Network (PLMN), etc.

The terminal device 110 may be any terminal device, including but not limited to a terminal device connected to the network device 120 or other terminal devices by wire or wirelessly.

For example, the terminal device 110 may refer to an access terminal, a user equipment (UE), a subscriber unit, a subscriber station, a mobile station, a mobile site, a remote station, a remote terminal, a mobile device, a user terminal, a terminal, a wireless communication device, user agent, or user device. The access terminal can be a cellular phone, a cordless phone, a session initiation protocol (SIP) phone, an IoT device, a satellite handheld terminal, a wireless local loop (WLL) station, a personal digital assistant (PDA), a handheld device with wireless communication functions, a computing device or other processing device connected to a wireless modem, a vehicle-mounted device, a wearable device, a terminal device in 5G networks or a terminal device in future evolution networks, etc.

The terminal device 110 may be used for device-to-device (D2D) communication.

The wireless communication system 100 may also include a core network device 130 for communicating with a base station. The core network device 130 may be a 5G core network (5G Core, 5GC) device, for example, an access and mobility management function (AMF), and for example, authentication server function (AUSF), and for example, user plane function (UPF), and for example, session management function (SMF). In some embodiments, the core network device 130 may also be an evolved packet core (EPC) device of the LTE network, for example, a session management function+core packet gateway (SMF+PGW-C) device. It should be understood that SMF+PGW-C can realize the functions of SMF and PGW-C at the same time. In the process of network evolution, the above-mentioned core network device may be referred to by other names, or a new network entity may be formed by dividing functions of the core network, which is not limited in this embodiment of the present application.

Various functional units in the communication system 100 may also establish a connection through a next generation network (NG) interface to implement communication.

For example, the terminal device establishes an air interface connection with the access network device through the NR interface to transmit user plane data and control plane signaling; the terminal device can establish a control plane signaling connection with the AMF through the NG interface 1 (abbreviated as N1); the access network device such as next-generation wireless access base stations (gNB) can establish a user plane data connection with the UPF through the NG interface 3 (abbreviated as N3); the access network device can establish a control plane signaling with the AMF through the NG interface 2 (abbreviated as N2); the UPF can establish a control plane signaling connection with the SMF through the NG interface 4 (abbreviated as N4); the UPF can exchange user plane data with the data network through the NG interface 6 (abbreviated as N6); the AMF can establish a control plane signaling connection with the SMF through the NG interface 11 (abbreviated as N11); the SMF can establish a control plane signaling connection with the PCF through the NG interface 7 (abbreviated as N7).

FIG. 1 shows, for example, a base station, a core network device, and two terminal devices. In some embodiments, the wireless communication system 100 may include multiple base station devices and each base station may include other numbers of terminals within the coverage area, which is not limited in the embodiment of this application.

The 3GPP is researching Non Terrestrial Network (NTN, non-terrestrial communication network device) technology. NTN generally provides communication services to ground users in the form of satellite communication. Compared with terrestrial cellular network communication, satellite communication has many unique advantages. First of all, satellite communication is not restricted by the user's region. For example, general land communication cannot cover areas such as oceans, mountains, deserts, etc. where communication equipment cannot be set up or the areas where communication coverage is not provided due to sparse population. As for satellite communication, since a satellite can cover a larger ground, and the satellite can orbit around the earth. So theoretically every corner of the earth can be covered by satellite communications. Secondly, satellite communication has great social value. Satellite communication can be covered at a lower cost in remote mountainous areas, poor and backward countries or regions, so that people in these regions can enjoy advanced voice communication and mobile Internet technology, which is conducive to narrowing the digital gap with developed regions and promoting development of these areas. Thirdly, the satellite communication distance is long, and the cost of communication does not increase significantly as the communication distance increases. Finally, satellite communication has high stability and is not limited by natural disasters.

The NTN technology can be combined with various communication systems. For example, the NTN technology can be combined with the NR system to form the NR-NTN system. For another example, the NTN technology can be combined with the IoT system to form the IoT-NTN system. As an example, the IoT-NTN system may include a NB-IoT-NTN system and an eMTC-NTN system.

Figure 2:
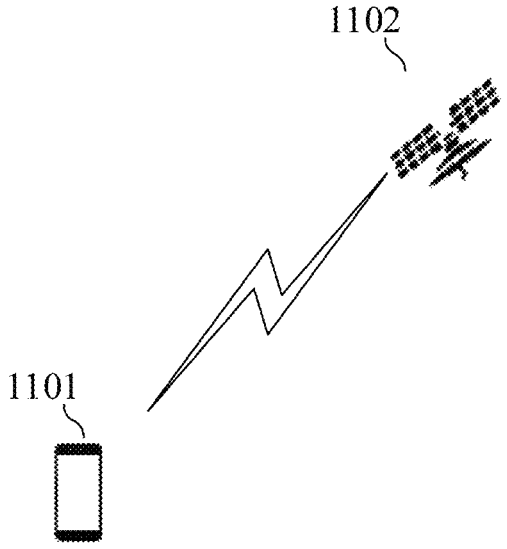
FIG. 2 is a schematic structural diagram of another communication system provided by an embodiment of the present application.

FIG. 2 is a schematic structural diagram of another communication system provided by an embodiment of the present application.

As shown in FIG. 2, a terminal device 1101 and a satellite 1102 are included, and wireless communication can be performed between the terminal device 1101 and the satellite 1102. The network formed between the terminal device 1101 and the satellite 1102 may also be referred to as NTN. In the architecture of the communication system shown in FIG. 2, the satellite 1102 may function as a base station, and the terminal device 1101 and the satellite 1102 may communicate directly. Under the system architecture, the satellite 1102 can be referred to as a network device. In some embodiments of the present application, the communication system may include multiple network devices 1102, and the coverage of each network device 1102 may include other numbers of terminal devices, which is not limited in this embodiment of the present application.

Figure 3:
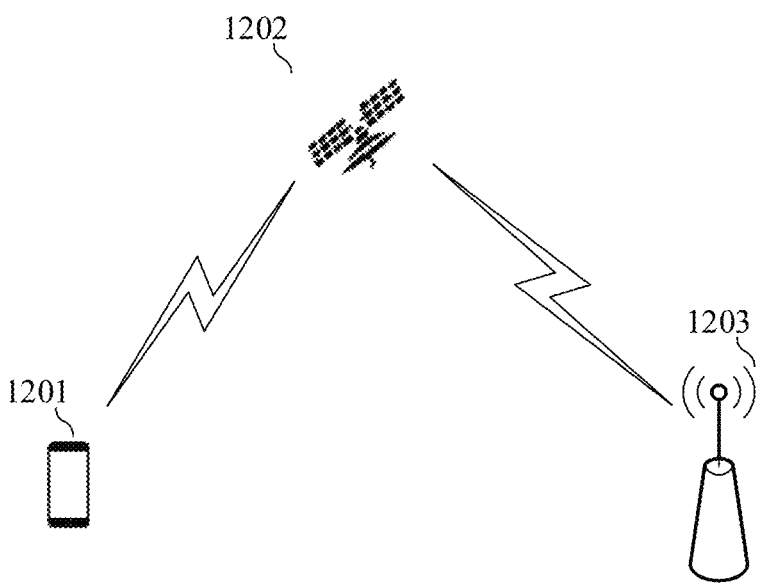
FIG. 3 is a schematic structural diagram of another communication system provided by an embodiment of the present application.

FIG. 3 is a schematic structural diagram of another communication system provided by an embodiment of the present application.

As shown in FIG. 3, it includes a terminal device 1201, a satellite 1202 and a base station 1203, wireless communication can be performed between the terminal device 1201 and the satellite 1202, and communication can be performed between the satellite 1202 and the base station 1203. The network formed among the terminal device 1201, the satellite 1202 and the base station 1203 may also be referred to as NTN. In the architecture of the communication system shown in FIG. 3, the satellite 1202 may not have the function of a base station, and the communication between the terminal device 1201 and the base station 1203 needs to be relayed through the satellite 1202. Under this system architecture, the base station 1203 may be referred to as a network device. In some embodiments of the present application, the communication system may include multiple network devices 1203, and the coverage of each network device 1203 may include other numbers of terminal devices, which is not limited in this embodiment of the present application. The network device 1203 may be the network device 120 in FIG. 1.

It should be understood that the aforementioned satellite 1102 or satellite 1202 includes but is not limited to:

Low-earth orbit (LEO) satellites, medium-earth orbit (MEO) satellites, geostationary earth orbit (GEO) satellites, high elliptical orbit (HEO) satellites, etc. The satellite can use multiple beams to cover the ground. For example, a satellite can form dozens or even hundreds of beams to cover the ground. In other words, a satellite beam can cover a ground area with a diameter of tens to hundreds of kilometers to ensure satellite coverage and improve the system capacity of the entire satellite communication system.

As an example, the altitude range of LEO can be 500 km~1500 km, the corresponding orbit period can be about 1.5 hours-2 hours, the signal propagation delay of single-hop communication between users can generally be less than 20 ms, and the maximum satellite visible time can be 20 minutes. The LEO signal propagation distance is short and the link loss is small, and the requirements for the transmission power of the user terminal are not high. The orbital height of GEO can be 35786 km, the rotation period around the earth can be 24 hours, and the signal propagation delay of single-hop communication between users can generally be 250 ms.

In order to ensure satellite coverage and improve the system capacity of the entire satellite communication system, satellites use multi-beams to cover the ground. A satellite can form dozens or even hundreds of beams to cover the ground; a satellite beam can cover the ground area that is tens to hundreds of kilometers in diameter.

It should be noted that FIG. 1 to FIG. 3 are only illustrations of systems applicable to this application, and of course, the method shown in the embodiment of this application may also be applicable to other systems. Furthermore, the terms "system" and "network" are often used interchangeably herein. The term "and/or" in this article is just an association relationship describing associated objects, which means that there can be three relationships, for example, A and/or B can mean these three cases: A exists alone, A and B exist simultaneously, and B exists alone. In addition, the character "/" in this article generally indicates that the contextual objects are an "or" relationship. It should also be understood that the "indication" mentioned in the embodiments of the present application may be a direct indication, may also be an indirect indication, and may also mean that there is an association relationship. For example, A indicates B, which can mean that A directly indicates B, for example, B can be obtained through A; it can also indicate that A indirectly indicates B, for example, A indicates C, and B can be obtained through C; it can also indicate that there is an association between A and B relation. It should also be understood that the "correspondence" mentioned in the embodiments of the present application may mean that there is a direct correspondence or an indirect correspondence between the two, or that there is an association between the two, or the relationship of indicating and being indicated, configurating and being configured. It should also be understood that the "predefined" or "predefined rules" mentioned in the embodiments of this application can be implemented by pre-saving corresponding codes, tables or other means for indicating corresponding information in the device (e.g., including the terminal device and the network device), and this application does not limit the specific implementation. For example, pre-defined may refer to defined in the protocol. It should also be understood that in the embodiment of the present application, the "protocol" may refer to a standard protocol in the communication field, for example, it may include the LTE protocol, the NR protocol, and related protocols applied to future communication systems, which is not limited in this application.

Satellites can be classified into two types based on the functions they provide: transparent payload and regenerative payload. For the transparent transponder satellite, it only provides the functions of radio frequency filtering, frequency conversion and amplification, and only provides transparent transponder of the signal without changing the waveform signal it transponders. For regenerative transponder satellites, in addition to providing radio frequency filtering, frequency conversion and amplification functions, it can also provide demodulation/decoding, routing/conversion, coding/modulation functions, which have part or all of the functions of the base station.

In the NTN, one or more gateways may be included for communication between satellites and terminals.

Figure 4:
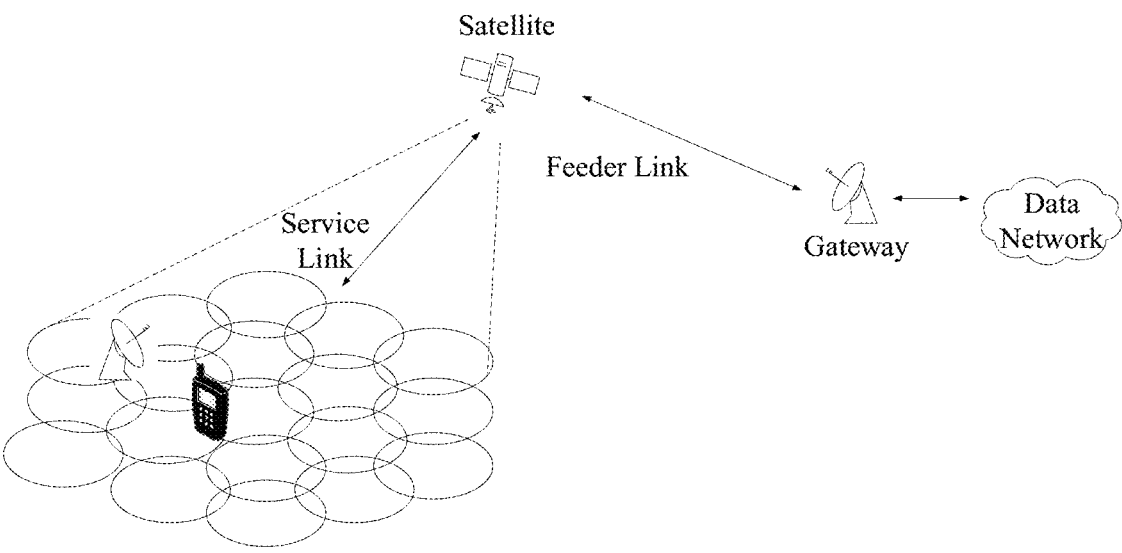
FIG. 4 shows a schematic diagram of an NTN scenario based on transparent transmission forwarding satellites.
Figure 5:
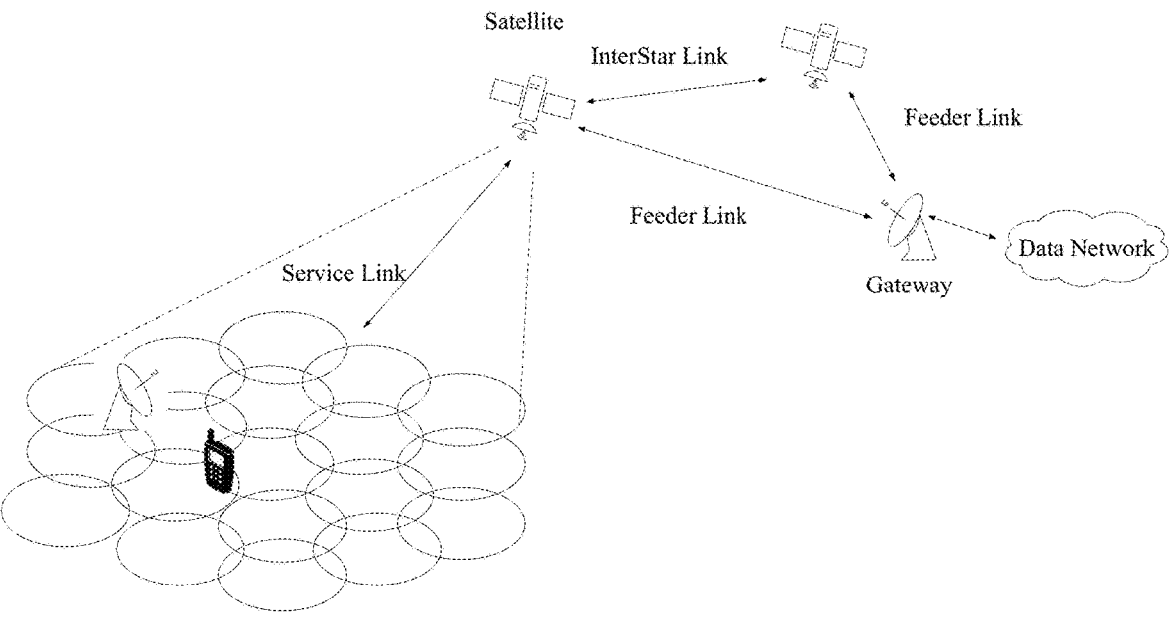
FIG. 5 shows a schematic diagram of an NTN scenario based on regenerative-relay satellites.

FIG. 4 and FIG. 5 respectively show schematic diagrams of NTN scenarios based on transparent transmission forwarding satellites and regenerative forwarding satellites.

As shown in FIG. 4, for the NTN scenario based on transparent transmission and forwarding satellites, the communication between the gateway and the satellite is through the feeder link, and the communication between the satellite and the terminal can be through the service link. As shown in FIG. 5, for the NTN scenario based on regenerative forwarding satellites, the communication between satellites is through the InterStar link, the communication between the gateway and the satellite is through the feeder link, and the communication between the satellite and the terminal can be done through the service link.

The timing relationship of the NTN system will be described below.

In land communication systems, the propagation delay of signal communication is usually less than 1 ms. In the NTN system, due to the long communication distance between terminal device and satellites (or network device), the propagation delay of signal communication is very large, ranging from tens of milliseconds to hundreds of milliseconds, depending on the satellite orbital height and the service type of the satellite communication. In order to deal with relatively large propagation delays, the timing relationship of the NTN system needs to be enhanced relative to the NR system.

The following is an introduction to the relevant content of the NTN system:

1. Timing Relationship of NTN System

In land communication systems, the propagation delay of signal communication is usually less than 1 ms. In the NTN system, due to the long communication distance between terminal device and satellites (or network device), the propagation delay of signal communication is very large, ranging from tens of milliseconds to hundreds of milliseconds, depending on the satellite orbital height and the service type of the satellite communication. In order to deal with relatively large propagation delays, the timing relationship of the NTN system needs to be enhanced relative to the NR system.

Figure 6:
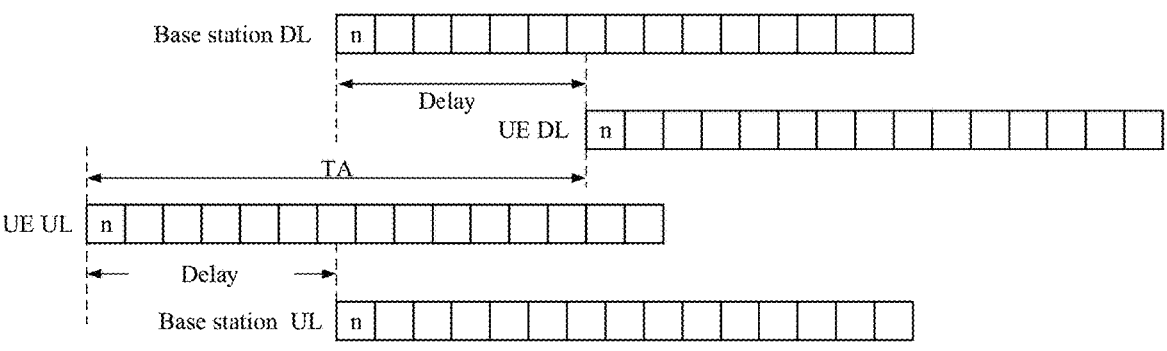
FIG. 6 is a schematic diagram of the timing relationship (case 1) of the NTN system.
Figure 7:
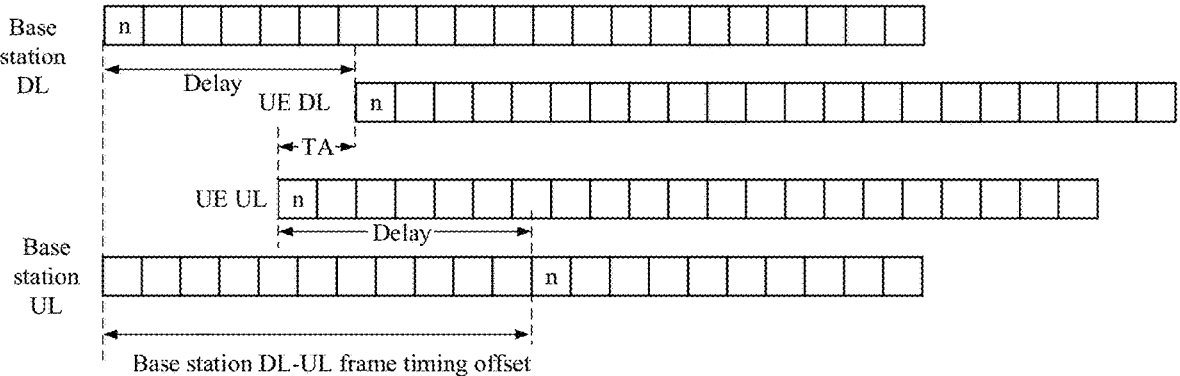
FIG. 7 is a schematic diagram of the timing relationship (case 2) of the NTN system.

In the NR-NTN or IoT (Internet of Things)-NTN system, like the NR system, the UE needs to consider the impact of timing advance (TA) when performing uplink transmission. Since the propagation delay in the system is relatively large, the range of the TA value is also relatively large. When the UE is scheduled to perform uplink transmission in time slot n (or subframe n), the UE considers the round-trip propagation delay and transmits in advance during uplink transmission, so that the signal is on the uplink time slot n (or subframe n) of the network device side when the signal arrives at the network device side. Specifically, the timing relationship in the NTN system may include two situations, as shown in FIG. 6 and FIG. 7 respectively.

Case 1: As shown in FIG. 6, the downlink subframe and the uplink subframe on the network device side are aligned. Correspondingly, in order to make the uplink transmission of the UE aligned with the uplink subframe of the network device side when it arrives at the network device side, the UE needs to use a larger TA value. In some cases, the TA value corresponds to a timing offset value Koffset.

Case 2: As shown in FIG. 7, there is an offset value between the downlink subframe and the uplink subframe on the network device side. In this case, if the uplink transmission of the UE is to be aligned with the uplink subframe on the network device side when it arrives at the network device side, the UE only needs to use a smaller TA value. In some cases, the TA value corresponds to a timing offset value Koffset. In other cases, the round-trip transmission time RTT of the UE corresponds to the timing offset value Koffset.

2. Synchronization Assistance Information Indication in NTN System

In the NTN system, the network device needs to send synchronization assistance information such as satellite ephemeris information, reference point position, common timing offset value (such as the timing offset value between the network device and the reference point and/or the timing offset value between the network device and the satellite), a timestamp, etc., is used for the terminal device to complete time domain and/or frequency domain synchronization. Correspondingly, the terminal device needs to obtain the synchronization assistance information sent by the network device, and at the same time complete corresponding time domain and/or frequency domain synchronization according to its own global navigation satellite system (GNSS) capability.

In this application, the satellite ephemeris information includes satellite position and velocity state (PVS) vector information. The terminal device obtains the PVS vector information of the satellite according to the ephemeris information format sent by the network device. Since the PVS vector information is associated with time information, in some cases, the PVS vector information can also be considered as a position velocity time (PVT) parameter.

Specifically, the format of the ephemeris information sent by the network device may include the following two manners:

Manner 1: Ephemeris information format based on orbit information.

Figure 8:
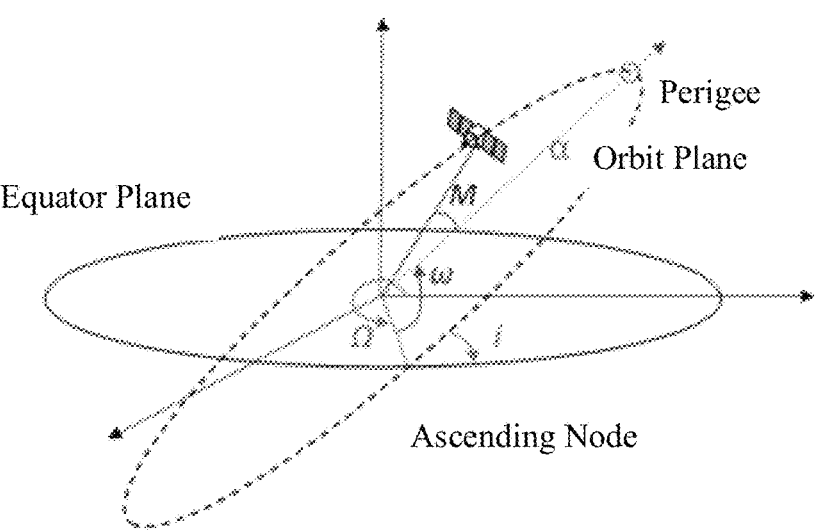
FIG. 8 is a schematic diagram of ephemeris parameters.

In this manner, the network device broadcasts the ephemeris parameters ($\alpha$ (km), e, I (deg), $\Omega$ (deg), $\omega$ (deg), M (deg)) at time t0, see FIG. 8. In the embodiment, $\alpha$ represents the semi-major (the unit can be meters), e represents the eccentricity, $\omega$ represents the argument of periapsis (the unit can be rad (radian angle)), $\Omega$ represents the longitude of ascending node (the unit can be rad), i represents the inclination (the unit can be rad), M represents the mean anomaly M at epoch time $t_0$ (the unit can is rad).

Further, the terminal device can obtain the PVS vector of the satellite at the time t0 based on the earth-centered, earth-fixed (ECEF) coordinate system (also referred to as the geocentric coordinate system) based on the received ephemeris parameters at the time t0; according to the PVS vector based on the geocentric coordinate system of the satellite at time t0, the terminal device can obtain the PVS vector of the satellite based on the geocentric coordinate system at time t.

Or, further, the terminal device obtains the ephemeris parameters of the satellite at time t according to the received ephemeris parameters of the satellite at time t0. Then, according to the ephemeris parameter of the satellite at time t, the terminal device can obtain the PVS vector of the satellite based on the geocentric coordinate system at time t.

The PVS vector based on the geocentric coordinate system includes ($S_X$, $S_Y$, $S_Z$, $V_X$, $V_Y$, $V_Z$). In the embodiment, the ($S_X$, $S_Y$, $S_Z$) corresponds to the satellite position, and the ($V_X$, $V_Y$, $V_Z$) corresponds to the satellite velocity.

As an example, in this method, the format of the ephemeris information notified by the network device is as follows:

In the above two manners, for the ephemeris information notification of the satellite at time t0, the information at time t0 can be obtained implicitly through the downlink time unit that receives the ephemeris information. In addition, the notification of manner 1 has less overhead than manner 2. However, in manner 1, the terminal device needs to model and estimate the PVS vector of the satellite, so the accuracy is worse than that of manner 2.

3. Timing Adjustment in NTN System

In the NTN system, network device needs to send synchronization assistance information to terminal device such as ephemeris information (satellite moving speed and/or satellite position), reference point position, common timing offset value (such as the timing offset value between network device and reference point and/or the timing offset value between the network device and the satellite), timestamp and other information, used for the terminal device to complete time domain and/or frequency domain synchronization. Correspondingly, the terminal device needs to obtain the synchronization assistance information sent by the network device, and at the same time complete corresponding time domain and/or frequency domain synchronization according to its own GNSS capability. A terminal device should obtain at least one of the following information based on its GNSS capabilities: position, time reference and frequency reference of the terminal device. In addition, based on the above information, as well as the synchronization assistance information (such as serving satellite ephemeris information or time stamp) indicated by the network device, the terminal device can calculate the timing and frequency offset, and apply timing advance compensation or frequency offset adjustment in the idle state or inactive state or connected state.

| Epoch time $t_0$ | $\alpha$ (km) | e | I (deg) | $\Omega$ (deg) | $\omega$ (deg) | M (deg) |
|---|---|---|---|---|---|---|
| 2021/01/01-00:00:00.000 | 6919.955143 | 0.001650732 | 97.574021193 | 36.126537772 | 64.902440674 | 295.175021671 |
| 2021/01/01-00:00:01.000 | 6919.951705 | 0.001651935 | 97.574022789 | 36.126537826 | 64.940253179 | 295.200230115 |
| 2021/01/01-00:00:02.000 | 6919.948274 | 0.001653137 | 97.574024401 | 36.126537882 | 64.978022032 | 295.225482138 |

As another example, correspondingly, the PVS vector obtained by the terminal device is as follows:

As an example, the terminal device performs UE-specific TA estimation in the following manners:

| Epoch time t0 | $S_X$ (km) | $S_Y$ (km) | $S_Z$ (km) | $V_X$ (km/s) | $V_Y$ (km/s) | $V_Z$ (km/s) |
|---|---|---|---|---|---|---|
| 2021/01/01-00:00:00.000 | 5584.564377 | 4078.146732 | −11.231645 | 0.591075179 | −0.807929297 | 7.528623249 |
| 2021/01/01-00:00:01.000 | 5585.151982 | 4077.336215 | −3.702637 | 0.584333173 | −0.812851898 | 7.528630518 |
| 2021/01/01-00:00:02.000 | 5585.732846 | 4076.520777 | 3.826369 | 0.577590439 | −0.817773537 | 7.528628699 |

Manner 2: The ephemeris information format based on the instantaneous state vector, such as the PVS vector of the satellite at a specific moment, or the ephemeris information format based on the PVT.

In this manner, the network device broadcasts to the terminal device the PVS vector ($S_X$, $S_Y$, $S_Z$, $V_X$, $V_Y$, $V_Z$) based on the earth coordinate system of the satellite at time t0. The terminal device obtains the PVS vector based on the earth coordinate system of the satellite at time t according to the PVS vector based on the earth system of the satellite at time t0.

Manner 1: The terminal device estimates the UE-specific TA based on the location obtained by GNSS and the ephemeris information of the serving satellite indicated by the network device;

Manner 2: The terminal device estimates the UE-specific TA based on the reference time acquired by the GNSS and the reference time indicated by the network device, such as a time stamp.

Before the random access procedure is initiated, the terminal device in the idle state or the inactive state can calculate the TA value according to the following manner, and transmit the Msg1 or the MsgA according to the determined TA:

$$T_{TA}=(N_{TA,\ UE\text{-}specific}+N_{TA,\ offset}+N_{TA,\ common})^*T_c$$

In the embodiment, $N_{TA,\ UE\text{-}specific}$ can be the TA value estimated by the terminal device itself. $N_{TA,\ offset}$ is the same as related protocols. For example, it is determined according to the network deployment frequency band and LTE or NR coexistence. $N_{TA,\ common}$ includes the common timing offset value broadcasted by the network device, the granularity or unit of $N_{TA,\ common}$ is determined according to the $T_c$, and $T_c$ represents the sampling time interval unit, $T_c=1/(480*1000*4096)$.

In some cases, if the terminal device is in the connected state, the TA value can be calculated according to the following formula, and the uplink channel or signal transmission can be performed according to the determined TA:

$$T_{TA}=(N_{TA}+N_{TA,\ UE\text{-}specific}+N_{TA,\ offset}+N_{TA,\ common})^*T_c$$

In the embodiment, $N_{TA,\ UE\text{-}specific}$ can be the TA value estimated by the terminal device itself. $N_{TA,\ offset}$ is the same as related protocols. For example, it is determined according to the network deployment frequency band and LTE or NR coexistence. $N_{TA,\ common}$ includes the common timing offset value broadcasted by the network device, $N_{TA}$ may be the TA value indicated by the network device.

That is to say, if the terminal device is in the connected state, the terminal device needs to jointly estimate and update the TA according to the TA value estimated by the terminal device itself, the common timing offset value broadcast by the network device, and the TA value indicated by the network device.

In the related art, only the format in which the network device on the ground broadcasts the ephemeris information of the serving satellite is considered. In actual situations, it may happen that a network device on the ground, such as a ground station, relays signals through multiple serving satellites to serve multiple ground cells on the ground, as shown in FIG. 9. In this complex network deployment scenario, it is necessary to consider how network devices notify ephemeris information, so as to better assist terminal devices to complete time-frequency synchronization.

FIG. 10 is a schematic flowchart of an information transmission method 200 according to an embodiment of the present application. The method can be applied to the systems shown in FIGS. 1 to 9 in some embodiments, but is not limited thereto. The method includes at least some of the following.

S210. The terminal device receives synchronization assistance information, wherein the synchronization assistance information has a first association relationship with first information.

S220. The terminal device acquires synchronization according to the synchronization assistance information.

For example, the terminal device may receive synchronization assistance information from the network device, and acquire time synchronization and/or frequency synchronization according to the synchronization assistance information.

In actual situations, it may happen that one network device on the ground, such as a ground station, relays signals through multiple serving satellites to serve multiple ground cells on the ground. Therefore, the network device needs to broadcast the ephemeris information associated with one or more satellites to the terminal device. For example, in the scenario shown in FIG. 9, in the first period of time, satellite 1 provides service for ground cell 1; but in the second period, with the departure of satellite 1 and the arrival of satellite 2, it may become satellite 2 provides service for the ground cell 1. In this case, the terminal device needs to know that in the first period of time, the pre-estimation of time-frequency synchronization should be performed according to the ephemeris information of satellite 1 provided by the network device, and in the second period of time, the pre-estimation of time-frequency synchronization should be performed according to the ephemeris information of satellite 2 provided by the network device.

In some embodiments, the first information includes at least one of:

time information, ephemeris information format, group identifier, reference signal index, cell identifier, antenna polarization mode, satellite identifier, serving satellite, service duration of serving satellite, satellite to provide service, time when satellite to provide service starts service, service duration of the satellite to provide service, satellite to not provide service, and time when satellite to not provide service stops service.

In some embodiments, the reference signal index includes SSB (Synchronization Signal and PBCH (Physical Broadcast CHannel) Block) index and/or CSI-RS (Channel State Information-Reference Signal) index.

For example, the first association relationship includes an association relationship between synchronization assistance information and time information. For another example, the first association relationship includes the association relationship between the synchronization assistance information and the ephemeris information format. For another example, the first association relationship includes an association relationship between the synchronization assistance information and the group identifier. For another example, the first association relationship includes an association relationship between the synchronization assistance information and the SSB index or the CSI-RS index. For another example, the first association relationship includes an association relationship between the synchronization assistance information and the cell identifier. For another example, the first association relationship includes an association relationship between the synchronization assistance information and the antenna polarization mode. For another example, the first association relationship includes an association relationship between synchronization assistance information and satellite identifiers. For another example, the first association relationship includes an association relationship between the synchronization assistance information and the serving satellite. For another example, the first association relationship includes an association relationship between the synchronization assistance information and the service duration of the serving satellite.

In some embodiments, the synchronization assistance information is used to determine at least one of:

ephemeris information, common timing advance (TA) value, common TA value change information, common frequency offset value, common frequency offset value change information, terminal device location information, and reference point information.

In some embodiments, the ephemeris information is used to determine satellite position information and/or satellite velocity information. For example, ephemeris information is used to indicate position information of satellites and/or velocity information of satellites. As an example, the ephemeris information format may be based on that of PVT. For another example, the ephemeris information is used to indicate the satellite's ephemeris parameters ($\alpha$ (km), e, I (deg), Ω (deg), ω (deg), M (deg)). The terminal device determines the position information of the satellite and/or the velocity information of the satellite according to the ephemeris parameters of the satellite. As an example, the ephemeris information format may be an orbit information-based ephemeris information format.

In some embodiments, the synchronization assistance information is carried by at least one of system message, handover command, radio resource control (RRC) signaling, medium access control element (MAC CE) and downlink control information (DCI).

In some embodiments, the system message includes a non-terrestrial network (NTN) dedicated system message.

In some embodiments, the terminal device receiving the synchronization assistance information includes: the terminal device receiving the synchronization assistance information according to at least one of a system message sent by the network device, a handover (handover) command, RRC, MAC CE and DCI.

For example, the terminal device receives the NTN-SIB message sent by the network device, and the NTN-SIB message includes at least one set of ephemeris information corresponding to the network device.

For another example, an NTN-SIB message only includes indication information of a set of ephemeris information.

For another example, one NTN-SIB message includes indication information of multiple sets of ephemeris information.

For another example, the terminal device receives one or more sets of ephemeris information according to a handover command sent by the network device.

In some embodiments, the synchronization assistance information includes at least one set of ephemeris information, and a first ephemeris information group in the at least one set of ephemeris information includes at least one piece of first ephemeris information, and the first ephemeris information group and the first information has the first association relationship.

For example, the terminal device may receive at least one set of ephemeris information sent by the network device, and acquire time synchronization and/or frequency synchronization according to a first ephemeris information group in the at least one set of ephemeris information.

It should be understood that in some cases, for example, when only one piece of ephemeris information is included in a set of ephemeris information, there may be no concept of an ephemeris information group.

In some embodiments, the synchronization assistance information includes at least one piece of first ephemeris information, and the at least one piece of first ephemeris information has the first association relationship with the first information.

In some embodiments, the first association relationship is obtained through at least one of system message, handover command, RRC signaling, MAC CE and DCI.

In some embodiments, the first association relationship is obtained according to a predefined rule.

For example, the synchronization assistance information may include multiple sets of ephemeris information, one of which is the first ephemeris information group. The first ephemeris information group may include a plurality pieces of first ephemeris information, and the plurality pieces of first ephemeris information have a first association relationship with the first information. For example, a plurality pieces of first ephemeris information in the first ephemeris information group have a first association relationship with a certain ephemeris information format. For another example, a plurality pieces of first ephemeris information in the first ephemeris information group have a first association relationship with a certain antenna polarization mode.

In some embodiments, the first ephemeris information group includes a plurality pieces of first ephemeris information, and each piece of first ephemeris information in the plurality pieces of first ephemeris information is used to determine a position velocity time (position Velocity and Time, PVT) parameter of the satellite.

In some embodiments, the terminal device obtains the first association relationship through predefined or indication information sent by the network device. For example, the terminal device obtains the first association relationship according to at least one of system message, handover command, RRC, MAC CE, and DCI sent by the network device.

In some embodiments, the first association relationship includes an association relationship between the first ephemeris information group and the serving satellite, or, the first ephemeris information group includes ephemeris information of the serving satellite of the terminal device.

For example, the first ephemeris information group is the ephemeris information of the serving satellite of the terminal device, the terminal device determines the serving satellite according to the position information obtained by GNSS, and obtains the first time synchronization and/or the first frequency synchronization according to the first ephemeris information group.

In some embodiments, the first association relationship includes an association relationship between the first ephemeris information group and the satellite that will provide service, or the first ephemeris information group includes ephemeris information of the satellite that will serve the terminal device.

For example, the first ephemeris information is the ephemeris information of the satellite that will serve the terminal device. The terminal device determines the next satellite that will serve the terminal device according to the position information obtained by GNSS, and obtains the first time synchronization and/or first frequency synchronization according to the first ephemeris information group.

In some embodiments, the first association relationship includes the association relationship between the first ephemeris information group and the first reference signal index, such as the first SSB index, or the first ephemeris information group is the ephemeris information corresponding to the beam direction associated with the first reference signal index.

For example, the first ephemeris information group is associated with the first SSB index, and the terminal device acquires first time synchronization and/or first frequency synchronization corresponding to the first SSB index according to the first ephemeris information group.

In some embodiments, when the plurality pieces of first ephemeris information are arranged sequentially, the corresponding multiple times are monotonically increasing or monotonically decreasing. In some cases, the multiple times corresponding to the sequential arrangement of the multiple pieces of first ephemeris information may be time points. For example, t1, t2, t3, t4, t5 are monotonically increasing. The first ephemeris information group includes 5 pieces of first ephemeris information, the 5 pieces of first ephemeris information correspond to the t1, t2, t3, t4, t5, and the 5 pieces of first ephemeris information are arranged according to the time order t1, t2, t3, t4, t5. Alternatively, the five pieces of first ephemeris information may also be arranged in the time order t5, t4, t3, t2, t1.

In some embodiments, the time corresponding to at least one piece of first ephemeris information in the first ephemeris information group is determined according to the downlink time unit when the network device sends the synchronization assistance information.

In some embodiments, the downlink time unit may be a time slot, a subframe or a symbol.

For example, the time corresponding to at least one piece of first ephemeris information in the multiple pieces of first ephemeris information is determined according to the starting position of the downlink time unit in which the network device sends the ephemeris information. As an example, the time corresponding to the first or last piece of first ephemeris information in the plurality pieces of first ephemeris information is determined according to the starting position of the downlink time unit when the network device sends the ephemeris information.

In some embodiments, the first ephemeris information group includes a plurality pieces of first ephemeris information, and the plurality pieces of first ephemeris information correspond to a plurality of different times. As an example, the first ephemeris information included in the first ephemeris information group is shown in the following table.

TABLE 1

| First Ephemeris Information Indication | |
| --- | --- |
| Time | First Ephemeris Information |
| t0 | Ephemeris Information 1_0 |
| t1 | Ephemeris Information 1_1 |
| t2 | Ephemeris Information 1_2 |
| . . . | . . . |
| tn | Ephemeris Information 1_n |

The terminal device can obtain the ephemeris information at any time from t0 to tn according to Table 1. For example, if the terminal device wants to obtain the ephemeris information at time t, and t is a time between t1 and t2, the terminal device can obtain the ephemeris information at time t according to the ephemeris information 1-1 and the ephemeris information 1-2, for example, by interpolation.

In some embodiments, the time interval between two adjacent times corresponding to two adjacent pieces of first ephemeris information in the multiple pieces of first ephemeris information is predefined or configured by a network device.

In some embodiments, the at least one set of ephemeris information includes a second ephemeris information group, the second ephemeris information group includes at least one piece of second ephemeris information, and the second ephemeris information group has a second relationship with the first information.

For example, the first ephemeris information group is associated with the serving satellite, and the second ephemeris information group is associated with the satellite that will provide services.

For another example, the first ephemeris information group is associated with the first reference signal index, and the second ephemeris information group is associated with the second reference signal index.

For another example, the first ephemeris information group is associated with the first group identifier, and the second ephemeris information group is associated with the second group identifier.

For another example, the first ephemeris information group is associated with the first cell identifier, and the second ephemeris information group is associated with the second cell identifier.

In some embodiments, the synchronization assistance information includes at least one piece of second ephemeris information, and the at least one piece of second ephemeris information has the second association relationship with the first information.

In some embodiments, the second association relationship is obtained through at least one of: system message, handover command, radio resource control (RRC) signaling, medium access control (MAC) control element (CE) and downlink control information (DCI).

In some embodiments, the second association relationship is obtained according to a predefined rule.

In some embodiments, the first association relationship and the second association relationship are the same association relationship. For example, the first association relationship includes the association relationship between the first ephemeris information and the group identifier, and the second association relationship also includes the association relationship between the second ephemeris information and the group identifier. As an example, the first ephemeris information is associated with the first group identifier, and the second ephemeris information is associated with the second group identifier.

In some embodiments, at least part of the ephemeris information in the first ephemeris information group and the second ephemeris information group correspond to the same time. For example, the end time of the first ephemeris information group overlaps with the start time of the second ephemeris information group. For another example, the first ephemeris information group corresponds to the first time period, the second ephemeris information group corresponds to the second time period, and the end time of the first time period overlaps with the start time of the second time period.

In some embodiments, at least one piece of first ephemeris information included in the first ephemeris information group and at least one piece of second ephemeris information included in the second ephemeris information group correspond to the same time. For example, the first ephemeris information group includes five pieces of first ephemeris information, corresponding to time t1, t2, t3, t4, and t5 respectively. The second ephemeris information group includes three pieces of second ephemeris information, corresponding to time t4, t5, and t6 respectively.

In some embodiments, the first ephemeris information included in the first ephemeris information group and the second ephemeris information included in the second ephemeris information group correspond to different times. For example, the first ephemeris information corresponds to the first time period, the second ephemeris information corresponds to the second time period, and the first time period and the second time period do not overlap. Specifically, for example, the first ephemeris information group includes five pieces of first ephemeris information, respectively corresponding to time t1, t2, t3, t4, and t5. The second ephemeris information group includes three pieces of second ephemeris information, corresponding to time t6, t7, and t8 respectively.

In some embodiments, all ephemeris information in the at least one set of ephemeris information corresponds to the same ephemeris information format.

In some embodiments, the first ephemeris information corresponds to a first ephemeris information format, and the second ephemeris information corresponds to a second ephemeris information format.

For example, it is assumed that the notification manner of the ephemeris information in the first ephemeris information format has higher precision than the notification manner of the ephemeris information in the second ephemeris information format. The first ephemeris information corresponds to the ephemeris information of the serving satellite, and the second ephemeris information corresponds to the ephemeris information of the satellite that is going to provide service. In the embodiment, the first ephemeris information corresponds to the first ephemeris information format, so as to ensure the accuracy of time-frequency synchronization corresponding to the serving satellite. The second ephemeris information corresponds to the second ephemeris information format, and is used for estimating possible time-frequency synchronization. Alternatively, the first ephemeris information corresponds to the ephemeris information of the satellite that will not provide service soon, the second ephemeris information corresponds to the ephemeris information of the serving satellite, the first ephemeris information corresponds to the second ephemeris information format, and the second ephemeris information corresponds to the first ephemeris information format. Alternatively, the first ephemeris information corresponds to the ephemeris information of the satellite that will not provide services soon, the second ephemeris information corresponds to the ephemeris information of the satellites that is going to provide services, the first ephemeris information corresponds to the second ephemeris information format, and the second ephemeris information corresponds to the first ephemeris information format.

In some embodiments, the first ephemeris information and the second ephemeris information correspond to the same ephemeris information format.

In some embodiments, the first ephemeris information included in the first ephemeris information group and the second ephemeris information included in the second ephemeris information group correspond to the same time.

For example, the first ephemeris information and the second ephemeris information are shown in the following table.

TABLE 2

Ephemeris Information Indication

| Time | First Ephemeris Information | Second Ephemeris Information |
|------|------------------------------|------------------------------|
| t0 | Ephemeris Information 1_0 | Ephemeris Information 2_0 |
| t1 | Ephemeris Information 1_1 | Ephemeris Information 2_1 |
| t2 | Ephemeris Information 1_2 | Ephemeris Information 2_2 |
| . . . | . . . | . . . |
| tn | Ephemeris Information 1_n | Ephemeris Information 2_n |

For example, the first ephemeris information corresponds to the ephemeris information of the currently serving satellite, such as the first satellite, and the second ephemeris information corresponds to the ephemeris information of the next satellite serving the ground cell, such as the second satellite. If the terminal device determines that the first satellite provides services at time t, the terminal device may obtain ephemeris information at time t according to the first ephemeris information, so as to obtain corresponding time domain synchronization and/or frequency synchronization. If the terminal device determines that the second satellite provides services at time t, the terminal device may obtain ephemeris information at time t according to the second ephemeris information, so as to obtain corresponding time domain synchronization and/or frequency synchronization.

For another example, the first ephemeris information corresponds to the first SSB index (or the first satellite beam or the first antenna polarization mode), and the second ephemeris information corresponds to the second SSB index (or the second satellite beam or the second antenna polarization mode). If the terminal device performs wireless communication with the network device according to the first SSB index, the terminal device may obtain ephemeris information at time t according to the first ephemeris information, so as to obtain corresponding time domain synchronization and/or frequency synchronization. If the terminal device performs wireless communication with the network device according to the second SSB index, the terminal device may obtain ephemeris information at time t according to the second ephemeris information, so as to obtain corresponding time domain synchronization and/or frequency synchronization.

In some embodiments, the at least one piece of first ephemeris information included in the first ephemeris information set and the at least one second ephemeris information included in the second ephemeris information set correspond to different times.

For example, the first ephemeris information and the second ephemeris information included in the ephemeris information are shown in the following table. In the embodiment, NA represents an invalid value.

TABLE 3

Ephemeris Information Indication

| Time | First Ephemeris Information | Second Ephemeris Information |
|------|------------------------------|------------------------------|
| t0 | Ephemeris Information1_0 | NA |
| t1 | Ephemeris Information1_1 | NA |
| t2 | Ephemeris Information1_2 | NA |
| . . . | . . . | NA |
| tn | Ephemeris Information1_n | Ephemeris Information2_n |
| tn + 1 | NA | Ephemeris Information2_n + 1 |
| tn + 2 | NA | Ephemeris Information2_n + 2 |
| . . . | NA | . . . |
| tn + m | NA | Ephemeris Information2_n + m |

According to Table 3, the terminal device can determine that the first ephemeris information is associated before time tn, and the second ephemeris information is associated after time tn. If the terminal device determines that time t is any time from t0 to tn, the terminal device may obtain ephemeris information at time t according to the first ephemeris information, thereby obtaining corresponding time domain synchronization and/or frequency synchronization. If the terminal device determines that time t is a certain time from tn to tn+m, the terminal device may obtain ephemeris information at time t according to the second ephemeris information, so as to obtain corresponding time domain synchronization and/or frequency synchronization.

For example, the first ephemeris information corresponds to the ephemeris information of the currently serving satellite, such as the first satellite, and the second ephemeris information corresponds to the ephemeris information of the next satellite serving the ground cell, such as the second satellite.

For another example, the first ephemeris information corresponds to the ephemeris information of the satellite associated with the first cell identifier, and the second ephemeris information corresponds to the ephemeris information of the satellite associated with the second cell identifier.

For another example, the first ephemeris information is associated with the first SSB index (or the first satellite beam or the first antenna polarization mode), and the second ephemeris information is associated with the second SSB index (or the second satellite beam or the second antenna polarization mode).

In some embodiments, the first ephemeris information included in the first ephemeris information group and the second ephemeris information included in the second ephemeris information group correspond to different times.

For example, the indication of ephemeris information is shown in the table below.

TABLE 4

| Ephemeris Information Indication | | |
|---|---|---|
| t0 | Ephemeris Information0 | In the same group, |
| t1 | Ephemeris Information1_1 | corresponding to the first |
| t2 | Ephemeris Information1_2 | ephemeris information |
| . . . | . . . | |
| tn | Ephemeris Information1_n | |
| tk | Ephemeris Information2_k | In the same group, |
| tk + 1 | Ephemeris Information2_k + 1 | corresponding to the second |
| tk + 2 | Ephemeris Information2_k + 2 | ephemeris information |
| . . . | . . . | |
| tk + m | Ephemeris Information2_k + m | |

Since there is no continuity between time tn and time tk, the terminal device can determine that the ephemeris information from time t0 to time tn belongs to the same group and corresponds to the first ephemeris information. The ephemeris information from time tk to tk+m belongs to the same group and corresponds to the second ephemeris information. In other words, according to Table 4, the terminal device can determine that the ephemeris information from time t0 to tn is associated with the first ephemeris information, and the ephemeris information from time tk to tk+m is associated with the second ephemeris information. If the terminal device determines that time t is any time from t0 to tn, the terminal device may obtain ephemeris information at time t according to the first ephemeris information, thereby obtaining corresponding time domain synchronization and/or frequency synchronization. If the terminal device determines that time t is a certain time from tk to tk+m, the terminal device may obtain ephemeris information at time t according to the second ephemeris information, so as to obtain corresponding time domain synchronization and/or frequency synchronization.

For example, the first ephemeris information corresponds to the ephemeris information of the currently serving satellite, such as the first satellite, and the second ephemeris information corresponds to the ephemeris information of the next satellite serving the ground cell, such as the second satellite.

For another example, the first ephemeris information corresponds to the ephemeris information of the satellite associated with the first cell identifier, and the second ephemeris information corresponds to the ephemeris information of the satellite associated with the second cell identifier.

For another example, the first ephemeris information is associated with the first SSB index (or the first satellite beam or the first antenna polarization mode), and the second ephemeris information is associated with the second SSB index (or the second satellite beam or the second antenna polarization mode).

In some embodiments, the terminal device acquires synchronization according to the synchronization assistance information, including:

acquiring, by the terminal device according to the synchronization assistance information, at least one of downlink time synchronization, downlink frequency synchronization, uplink time synchronization and uplink frequency synchronization.

In some embodiments, the terminal device acquires synchronization according to the synchronization assistance information, including:

acquiring, by the terminal device, first synchronization according to the first ephemeris information group; and/or, acquiring, by the terminal device, second synchronization according to the second ephemeris information group.

For example, the first synchronization may include first time synchronization and/or first frequency synchronization. The second synchronization may include a second time synchronization and/or a second frequency synchronization. In the embodiment, the time synchronization may also be referred to as time domain synchronization. The terminal device may receive the first ephemeris information group and/or the second ephemeris information group sent by the network device, acquire the first time synchronization and/or the first frequency synchronization according to the first ephemeris information group, and/or, acquire the second time synchronization and/or the second frequency synchronization according to the second ephemeris information group.

In the embodiment of the present application, the terminal device may receive synchronization assistance information such as one or more sets of ephemeris information from the network device. In the embodiment, each set of ephemeris information may include one or more pieces of ephemeris information. In this manner, the terminal device can perform time-frequency synchronization using corresponding synchronization assistance information such as ephemeris information in the current time period. In addition, the terminal device can also perform time-frequency synchronization in advance according to the corresponding synchronization assistance information such as ephemeris information in a subsequent time period, so as to ensure normal communication between the terminal device and the network device.

FIG. 11 is a schematic flowchart of an information transmission method 300 according to another embodiment of the present application. The method can be applied to the systems shown in FIGS. 1 to 9, but is not limited thereto. The method includes at least some of the following.

S310. The network device sends synchronization assistance information, wherein the synchronization assistance information has a first association relationship with first information.

In the embodiment, the synchronization assistance information is used to enable a terminal device to acquire synchronization.

In some embodiments, the first information includes at least one of:

time information, ephemeris information format, group identifier, reference signal index, cell identifier, antenna polarization mode, satellite identifier, serving satellite, service duration of serving satellite, satellite to provide service, time when satellite to provide service starts service, service duration of satellite to provide service, satellite to not provide service, and time when to not provide service will stop serving.

In some embodiments, the synchronization assistance information is used to determine at least one of:

ephemeris information, common timing advance TA value, common TA value change information, common frequency offset value, common frequency offset value change information, terminal device position information, and reference point information; wherein, the ephemeris information is used to determine satellite position information and/or satellite velocity information.

In some embodiments, the synchronization assistance information includes at least one set of ephemeris information, a first ephemeris information group in the at least one set of ephemeris information includes at least one piece of first ephemeris information, and the first ephemeris information group has the first association relationship with the first information.

In some embodiments, the first ephemeris information group includes a plurality pieces of first ephemeris information, and each piece of first ephemeris information in the plurality pieces of first ephemeris information is used for determining a position velocity time (PVT) parameter of a satellite.

In some embodiments, when the plurality pieces of first ephemeris information are arranged sequentially, corresponding plurality of times are monotonically increasing or monotonically decreasing.

In some embodiments, a time corresponding to the at least one piece of first ephemeris information in the first ephemeris information group is determined according to a downlink time unit for the network device to send the synchronization assistance information.

In some embodiments, the at least one set of ephemeris information includes a second ephemeris information group, the second ephemeris information group includes at least one piece of second ephemeris information, and the second ephemeris information group has a second association relationship with the first information.

In some embodiments, the second association relationship is obtained through at least one of system message, handover command, RRC signaling, MAC CE and DCI; or the second association relationship is obtained according to a predefined rule.

In some embodiments, the at least one piece of first ephemeris information included in the first ephemeris information group and the at least one piece of second ephemeris information included in the second ephemeris information group correspond to a same time.

In some embodiments, the first ephemeris information included in the first ephemeris information group and the second ephemeris information included in the second ephemeris information group correspond to different times.

In some embodiments, the first ephemeris information corresponds to a first ephemeris information format, and the second ephemeris information corresponds to a second ephemeris information format.

In some embodiments, the first ephemeris information and the second ephemeris information correspond to a same ephemeris information format.

In some embodiments, the first ephemeris information group is used to instruct the terminal device to acquire first synchronization; and/or, the second ephemeris information group is used to instruct the terminal device to acquire second synchronization.

In some embodiments, the synchronization assistance information is carried by at least one of system message, handover command, RRC signaling, MAC CE and DCI.

In some embodiments, the first association relationship is obtained through at least one of system message, handover command, RRC signaling, MAC CE and DCI; or the first association relationship is obtained according to a predefined rule.

In some embodiments, the system message includes a non-terrestrial network NTN dedicated system message.

In some embodiments, the synchronization assistance information is used to instruct the terminal to acquire at least one of: downlink time synchronization, downlink frequency synchronization, uplink time synchronization, and uplink frequency synchronization.

For a specific example of the method 300 performed by the network device in this embodiment, reference may be made to the relevant description about the network device in the above method 200, and details are not repeated here for brevity.

The following are a few specific examples. For ease of description, in the following examples, the ephemeris information is represented by PVT vectors.

Example 1

Figure 12:
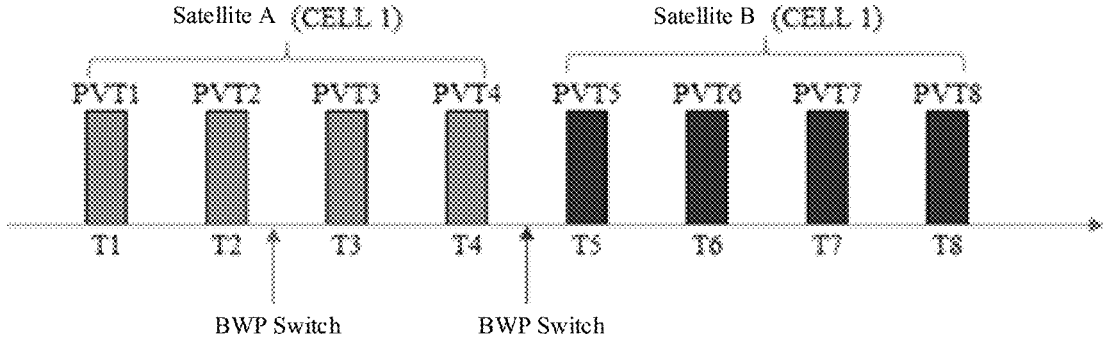
FIG. 12 is a schematic diagram of ephemeris information indication in Example 1.

As shown in FIG. 12, the terminal device receives multiple pieces of ephemeris information (or two sets of ephemeris information) sent by the network device. In the embodiment, PVT1~PVT4 correspond to the ephemeris information of satellite A at time T1~time T4, and PVT5~PVT8 correspond to the ephemeris information of satellite B at time T5~time T8. Both satellite A and satellite B correspond to the same cell such as CELL1. In the cell CELL1, if a bandwidth part (BWP) switch occurs on the terminal device at time t between T2 and T3, the terminal device can reuse the previous synchronization information. If the BWP switching occurs at time t between T4 and T5, the terminal device needs to re-synchronize according to the ephemeris information of satellite B.

In some cases, satellite A and satellite B may also be the same satellite, which is not limited in this application.

Example 2

Figure 13:
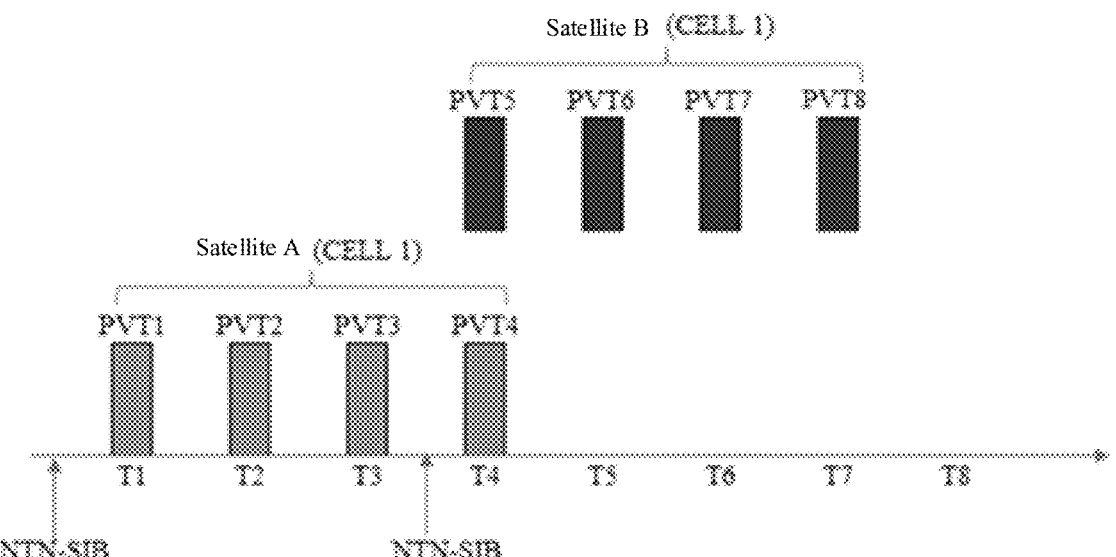
FIG. 13 is a schematic diagram of ephemeris information indication in Example 2.

As shown in FIG. 13, the terminal device receives multiple pieces of ephemeris information sent by the network device. In this example, the terminal device receives a set of ephemeris information PVT1~PVT4 sent by the network device through the NTN-SIB before time T1. PVT1~PVT4 correspond to the ephemeris information of satellite A at time T1~time T4. The terminal device receives another set of ephemeris information PVT5~PVT8 sent by the network device through the NTN-SIB between time T3 and time T4. PVT5~PVT8 correspond to the ephemeris information of satellite B at time T4~time T7. Both satellite A and satellite B correspond to the same cell such as CELL1. In the cell CELL1, since the time T4 corresponds to two pieces of ephemeris information, the terminal device can determine that the time T4 is a turning point. That is, PVT1~PVT4 correspond to the previous set of ephemeris information, and PVT5~PVT8 correspond to the latter set of ephemeris information.

In some cases, satellite A and satellite B may also be the same satellite, which is not limited in this application.

In some cases, PVT4 and PVT5 may also be the same ephemeris information, which is not limited in this application.

Example 3

Figure 14:
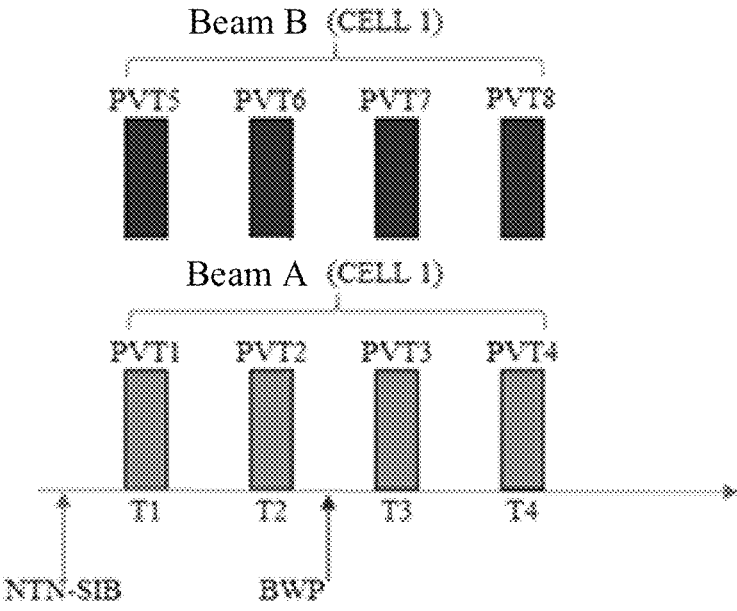
FIG. 14 is a schematic diagram of ephemeris information indication in Example 3.

As shown in FIG. 14. The terminal device receives multiple pieces of ephemeris information (or two sets of ephemeris information) sent by the network device. In this example, the terminal device receives two sets of ephemeris information PVT1~PVT4 and PVT5~PVT8 sent by the network device through the NTN-SIB before time T1. PVT1~PVT4 and PVT5~PVT8 correspond to the ephemeris information of beam A and beam B at time T1~time T4 respectively. Both beam A and beam B correspond to the same cell such as CELL1. In CELL1, if the terminal device has a BWP switch at time t between T2 and T3, the active BWP of the terminal device is switched from BWP A to BWP B, where BWP A is associated with beam A, and BWP B is associated with beam B, the terminal device needs to reacquire synchronization according to the ephemeris information corresponding to beam B.

In the NTN system, with the implementation of the embodiment of the present application, the network device can notify the terminal device of one or more sets of ephemeris information. In the embodiment, each set of ephemeris information includes one or more pieces of ephemeris information. In this way, the terminal device can use the corresponding ephemeris information in the current time period to perform time-frequency synchronization. In addition, the terminal device can also perform time-frequency synchronization in advance according to the corresponding ephemeris information in the subsequent time period, so as to ensure normal communication between the terminal device and the network device.

Figure 15:
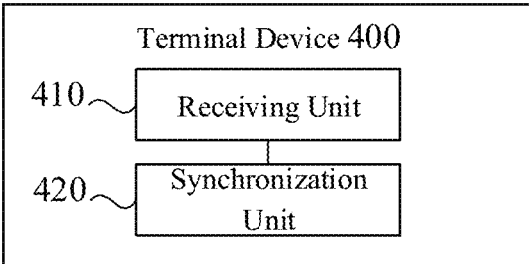
FIG. 15 is a schematic block diagram of a terminal device according to an embodiment of the present application.

FIG. 15 is a schematic block diagram of a terminal device 400 according to an embodiment of the present application. The terminal device 400 may include:

a receiving unit 410, configured to receive synchronization assistance information, wherein the synchronization assistance information has a first association relationship with first information; and a synchronization unit 420, configured to acquire synchronization according to the synchronization assistance information.

In some embodiments, the first information includes at least one of:

time information, ephemeris information format, group identifier, reference signal index, cell identifier, antenna polarization mode, satellite identifier, serving satellite, service duration of serving satellite, satellite to provide service, time when satellite to provide service starts service, the service duration of satellite to provide service, satellite to not provide service, and time when satellite to not provide service stops service.

In some embodiments, the synchronization assistance information is used to determine at least one of:

ephemeris information, common timing advance TA value, common TA value change information, common frequency offset value, common frequency offset value change information, terminal device position information, and reference point information; wherein, the ephemeris information is used to determine satellite position information and/or satellite velocity information.

In some embodiments, the synchronization assistance information includes at least one set of ephemeris information, a first ephemeris information group in the at least one set of ephemeris information includes at least one piece of first ephemeris information, and the first ephemeris information group has the first association relationship with the first information.

In some embodiments, the first ephemeris information group includes a plurality pieces of first ephemeris information, and each piece of first ephemeris information in the plurality pieces of first ephemeris information is used for determining a position velocity time PVT parameter of a satellite.

In some embodiments, when the plurality pieces of first ephemeris information are arranged sequentially, corresponding plurality of times are monotonically increasing or monotonically decreasing.

In some embodiments, a time corresponding to the at least one piece of first ephemeris information in the first ephemeris information group is determined according to a downlink time unit for a network device to send the synchronization assistance information.

In some embodiments, the at least one set of ephemeris information includes a second ephemeris information group, the second ephemeris information group includes at least one piece of second ephemeris information, and the second ephemeris information group has a second association relationship with the first information.

In some embodiments, the second association relationship is obtained through at least one of system message, handover command, RRC signaling, MAC CE and DCI; or the second association relationship is obtained according to a predefined rule.

In some embodiments, the at least one piece of first ephemeris information included in the first ephemeris information group and the at least one piece of second ephemeris information included in the second ephemeris information group correspond to a same time.

In some embodiments, the first ephemeris information included in the first ephemeris information group and the second ephemeris information included in the second ephemeris information group correspond to different times.

In some embodiments, the first ephemeris information corresponds to a first ephemeris information format, and the second ephemeris information corresponds to a second ephemeris information format.

In some embodiments, the first ephemeris information and the second ephemeris information correspond to a same ephemeris information format.

In some embodiments, the synchronization unit is further configured to:

acquire first synchronization according to the first ephemeris information group; and/or, acquire second synchronization according to the second ephemeris information group.

In some embodiments, the synchronization assistance information is carried by at least one of system message, handover command, radio resource control RRC signaling, medium access control control element MAC CE and downlink control information DCI.

In some embodiments, the first association relationship is obtained through at least one of system message, handover command, RRC signaling, MAC CE and DCI; or the first association relationship is obtained according to a predefined rule.

In some embodiments, the system message includes a non-terrestrial network NTN dedicated system message.

In some embodiments, the acquiring synchronization, by the terminal device, according to the synchronization assistance information includes:

acquiring, by the terminal device according to the synchronization assistance information, at least one of: downlink time synchronization, downlink frequency synchronization, uplink time synchronization, and uplink frequency synchronization.

The terminal device 400 in the embodiment of the present application can implement the corresponding functions of the terminal device in the foregoing method embodiments. For the processes, functions, implementations and beneficial effects corresponding to each module (submodule, unit or component, etc.) in the terminal device 400, reference may be made to the corresponding description in the above method embodiment, and details are not repeated here. It should be noted that the functions described by the various modules (submodules, units or components, etc.) in the terminal device 400 of the embodiment of the application can be implemented by different modules (submodules, units or components, etc.), or by the same module (submodule, unit or component, etc.).

Figure 16:
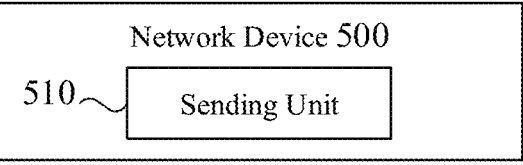
FIG. 16 is a schematic block diagram of a network device according to an embodiment of the present application.

FIG. 16 is a schematic block diagram of a network device 500 according to an embodiment of the present application. The network device 500 may include:

a sending unit 510, configured to send synchronization assistance information, wherein the synchronization assistance information has a first association relationship with first information;

wherein the synchronization assistance information is used to enable a terminal device to acquire synchronization.

In some embodiments, the first information includes at least one of:

time information, ephemeris information format, group identifier, reference signal index, cell identifier, antenna polarization mode, satellite identifier, serving satellite, service duration of serving satellite, satellite to provide service, time when satellite to provide service starts service, the service duration of satellite to provide service, satellite to not provide service, and time when satellite to not provide service stops service.

In some embodiments, the synchronization assistance information is used to determine at least one of:

ephemeris information, common timing advance TA value, common TA value change information, common frequency offset value, common frequency offset value change information, terminal device position information, and reference point information; wherein, the ephemeris information is used to determine satellite position information and/or satellite velocity information.

In some embodiments, the synchronization assistance information includes at least one set of ephemeris information, a first ephemeris information group in the at least one set of ephemeris information includes at least one piece of first ephemeris information, and the first ephemeris information group has the first association relationship with the first information.

In some embodiments, the first ephemeris information group includes a plurality pieces of first ephemeris information, and each piece of first ephemeris information in the plurality pieces of first ephemeris information is used for determining a position velocity time PVT parameter of a satellite.

In some embodiments, when the plurality pieces of first ephemeris information are arranged sequentially, corresponding plurality of times are monotonically increasing or monotonically decreasing.

In some embodiments, a time corresponding to the at least one piece of first ephemeris information in the first ephemeris information group is determined according to a downlink time unit for the network device to send the synchronization assistance information.

In some embodiments, the at least one set of ephemeris information includes a second ephemeris information group, the second ephemeris information group includes at least one piece of second ephemeris information, and the second ephemeris information group has a second association relationship with the first information.

In some embodiments, the second association relationship is obtained through at least one of system message, handover command, RRC signaling, MAC CE and DCI; or the second association relationship is obtained according to a predefined rule.

In some embodiments, the at least one piece of first ephemeris information included in the first ephemeris information group and the at least one piece of second ephemeris information included in the second ephemeris information group correspond to a same time.

In some embodiments, the first ephemeris information included in the first ephemeris information group and the second ephemeris information included in the second ephemeris information group correspond to different times.

In some embodiments, the first ephemeris information corresponds to a first ephemeris information format, and the second ephemeris information corresponds to a second ephemeris information format.

In some embodiments, the first ephemeris information and the second ephemeris information correspond to a same ephemeris information format.

In some embodiments, the first ephemeris information group is used to instruct the terminal device to acquire first synchronization; and/or, the second ephemeris information group is used to instruct the terminal device to acquire second synchronization.

In some embodiments, the synchronization assistance information is carried by at least one of system message, handover command, radio resource control RRC signaling, medium access control control element MAC CE and downlink control information DCI.

In some embodiments, the first association relationship is obtained through at least one of system message, handover command, RRC signaling, MAC CE and DCI; or the first association relationship is obtained according to a predefined rule.

In some embodiments, the system message includes a non-terrestrial network NTN dedicated system message.

In some embodiments, the synchronization assistance information is used to instruct the terminal to acquire at least one of: downlink time synchronization, downlink frequency synchronization, uplink time synchronization, and uplink frequency synchronization.

The network device 500 in the embodiment of the present application can implement the corresponding functions of the network device in the foregoing method embodiments. For the procedures, functions, implementations and beneficial effects corresponding to each module (submodule, unit or component, etc.) in the network device 500, reference can be made to the corresponding description in the above method embodiment, and details are not repeated here. It should be noted that the functions described by the modules (submodules, units or components, etc.) in the network device 500 of the embodiment of the application can be implemented by different modules (submodules, units or components, etc.), or by the same Module (submodule, unit or component, etc.).

Figure 17:
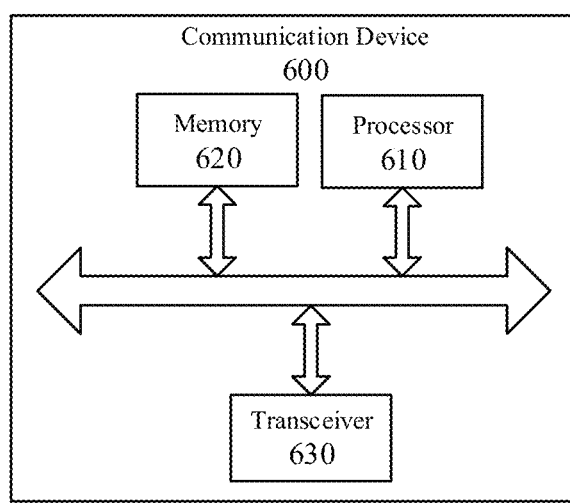
FIG. 17 is a schematic block diagram of a communication device according to an embodiment of the present application.

FIG. 17 is a schematic structural diagram of a communication device 600 according to an embodiment of the present application. The communication device 600 includes a processor 610, and the processor 610 can invoke and run a computer program from a memory, so that the communication device 600 implements the method in the embodiment of the present application.

In some embodiments, the communication device 600 may further include a memory 620. The processor 610 may call and run a computer program from the memory 620, so that the communication device 600 implements the method in the embodiment of the present application.

The memory 620 may be an independent device independent of the processor 610, or may be integrated in the processor 610.

In some embodiments, the communication device 600 may further include a transceiver 630, and the processor 610 may control the transceiver 630 to communicate with other devices, specifically, to send information or data to other devices, or receive information or data sent by other devices.

The transceiver 630 may include a transmitter and a receiver. The transceiver 630 may further include an antenna (s), and the number of the antenna may be one or more.

In some embodiments, the communication device 600 may be the network device of the embodiment of the present application, and the communication device 600 may implement the corresponding processes implemented by the network device in the methods of the embodiment of the present application. For the sake of brevity, it will not be repeated herein.

In some embodiments, the communication device 600 may be the terminal device of the embodiment of the present application, and the communication device 600 may implement the corresponding processes implemented by the terminal device in the methods of the embodiment of the present application. For the sake of brevity, it will not be repeated herein.

Figure 18:
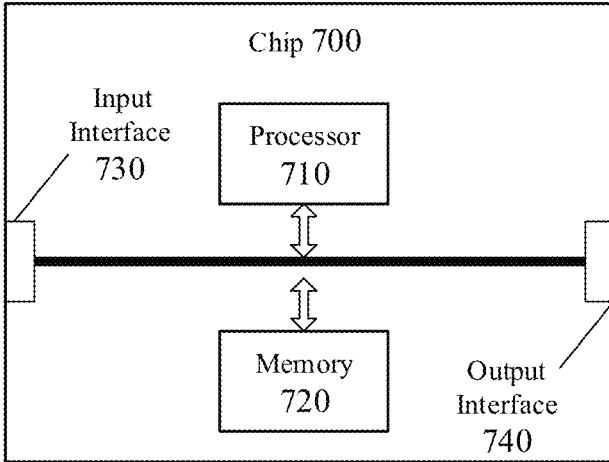
FIG. 18 is a schematic block diagram of a chip according to an embodiment of the present application.

FIG. 18 is a schematic structural diagram of a chip 700 according to an embodiment of the present application. The chip 700 includes a processor 710, and the processor 710 can invoke and run a computer program from a memory, so as to implement the method in the embodiment of the present application.

In some embodiments, the chip 700 may further include a memory 720. The processor 710 may invoke and run a computer program from the memory 720, so as to implement the method performed by the terminal device or the network device in the embodiment of the present application.

The memory 720 may be an independent device independent of the processor 710, or may be integrated in the processor 710.

In some embodiments, the chip 700 may also include an input interface 730. The processor 710 can control the input interface 730 to communicate with other devices or chips, specifically, can obtain information or data sent by other devices or chips.

Optionally, the chip 700 may also include an output interface 740. The processor 710 can control the output interface 740 to communicate with other devices or chips, specifically, can output information or data to other devices or chips.

In some embodiments, the chip can be applied to the network device in the embodiments of the present application, and the chip can implement the corresponding processes implemented by the network device in the methods of the embodiments of the present application. For the sake of brevity, it will not be repeated herein.

In some embodiments, the chip can be applied to the terminal device in the embodiments of the present application, and the chip can implement the corresponding processes implemented by the terminal device in the methods of the embodiments of the present application. For the sake of brevity, it will not be repeated herein.

The chip applied to the network device and the terminal device may be the same chip or different chips.

It should be understood that the chip mentioned in the embodiment of the present application may also be referred to as a system level chip, a system chip, a chip system or a system-on-chip.

The processor mentioned above can be a general-purpose processor, a digital signal processor (DSP), a field programmable gate array (FPGA), an application specific integrated circuit (ASIC) or other programmable logic devices, transistor logic devices, discrete hardware components, etc. Wherein, the general-purpose processor mentioned above may be a microprocessor or any conventional processor or the like.

The aforementioned memories may be volatile memories or nonvolatile memories, or may include both volatile and nonvolatile memories. The non-volatile memory can be read-only memory (ROM), programmable read-only memory (programmable ROM, PROM), erasable programmable read-only memory (erasable PROM, EPROM), electrically erasable programmable read-only memory (electrically EPROM, EEPROM) or flash memory. The volatile memory may be random access memory (RAM).

It should be understood that the above-mentioned memory is illustrative but not restrictive. For example, the memory in the embodiment of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM) and direct rambus random access memory (Direct Rambus RAM, DR RAM) and so on. That is, the memory in the embodiments of the present application is intended to include, but not be limited to, these and any other suitable types of memory.

Figure 19:
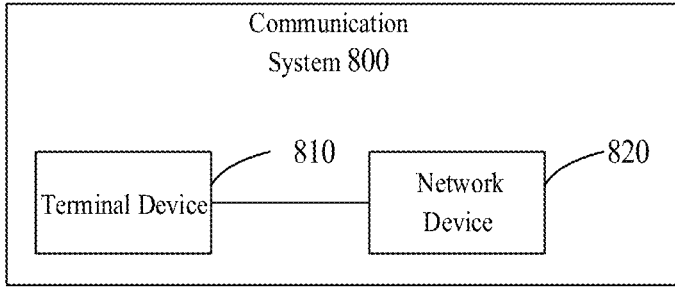
FIG. 19 is a schematic block diagram of a communication system according to an embodiment of the present application.

FIG. 19 is a schematic block diagram of a communication system 800 according to an embodiment of the present application. The communication system 800 includes a terminal device 810 and a network device 820.

The terminal device 810 is configured to receive synchronization assistance information, wherein the synchronization assistance information has a first association relationship with first information; and acquire synchronization according to the synchronization assistance information.

The network device 820 is configured to send synchronization assistance information, wherein the synchronization assistance information has a first association relationship with first information.

The terminal device 810 can be used to realize the corresponding functions realized by the terminal device in the above method; and the network device 820 can be used to realize the corresponding functions realized by the network device in the above method. For the sake of brevity, details are not repeated here.

In the above embodiments, all or part of them may be implemented by software, hardware, firmware or any combination thereof. When implemented using software, it may be implemented in whole or in part in the form of a computer program product. The computer program product includes one or more computer instructions. When the computer program instructions are loaded and executed on the computer, the processes or functions according to the embodiments of the present application will be implemented in whole or in part. The computer can be a general-purpose computer, a special purpose computer, a computer network, or other programmable device. The computer instructions may be stored in or transmitted from one computer-readable storage medium to another computer-readable storage medium, for example, the computer instructions may be transferred from a website, computer, server, or data center by wire (such as coaxial cable, optical fiber, digital subscriber line (DSL)) or wireless (such as infrared, wireless, microwave, etc.) to another website site, computer, server or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a DVD), or a semiconductor medium (such as a solid state disk (SSD)), etc.

It should be understood that, in various embodiments of the present application, the sequence numbers of the above-mentioned processes do not mean the order of execution, and the execution order of the processes should be determined by their functions and internal logic, and should not constitute any limitation on the implementation process of the embodiments of this application.

Those skilled in the art can clearly understand that for the convenience and brevity of the description, the specific operating process of the above-described system, device and unit can refer to the corresponding process in the foregoing method embodiment, which will not be repeated here.

The above is only the specific implementation of the application, but the scope of protection of the application is not limited thereto. Anyone familiar with the technical field can easily think of changes or substitutions within the technical scope disclosed in the application, which should be covered within the scope of protection of this application. Therefore, the protection scope of the present application should be based on the protection scope of the claims.

What is claimed is:

1. A method of information transmission, comprising:
receiving, by a terminal device, synchronization assistance information, wherein the synchronization assistance information has a first association relationship with first information; and
acquiring synchronization, by the terminal device, according to the synchronization assistance information;
wherein the synchronization assistance information comprises at least one set of ephemeris information, a first ephemeris information group in the at least one set of ephemeris information comprises at least one first ephemeris information, and the first ephemeris information group has the first association relationship with the first information; and wherein the at least one set of ephemeris information comprises a second ephemeris information group, the second ephemeris information group comprises at least one second ephemeris information, and the second ephemeris information group has a second association relationship with the first information.

2. The method according to claim 1, wherein the first information comprises at least one of:
time information, ephemeris information format, group identifier, reference signal index, cell identifier, antenna polarization mode, satellite identifier, serving satellite, service duration of serving satellite, satellite to provide service, time when satellite to provide service starts service, the service duration of satellite to provide service, satellite to not provide service, and time when satellite to not provide service stops service.

3. The method according to claim 1, wherein the synchronization assistance information is used to determine at least one of:
ephemeris information, common timing advance TA value, common TA value change information, common frequency offset value, common frequency offset value change information, terminal device position information, and reference point information; wherein, the ephemeris information is used to determine at least one of satellite position information or satellite velocity information.

4. The method according to claim 1, wherein the second association relationship is obtained through at least one of system message, handover command, RRC signaling, MAC CE and DCI; or
the second association relationship is obtained according to a predefined rule.

5. The method according to claim 1, wherein:
the at least one piece of first ephemeris information comprised in the first ephemeris information group and the at least one piece of second ephemeris information comprised in the second ephemeris information group correspond to a same time.

6. The method according to claim 1, wherein the first association relationship is obtained through at least one of system message, handover command, RRC signaling, MAC CE and DCI; or
the first association relationship is obtained according to a predefined rule.

7. A terminal device, comprising:
a processor and a memory, the memory being configured to store a computer program, which when executed by the processor causes the terminal device to:
receive synchronization assistance information, wherein the synchronization assistance information has a first association relationship with first information; and
acquire synchronization according to the synchronization assistance information;
wherein the synchronization assistance information comprises at least one set of ephemeris information, a first ephemeris information group in the at least one set of ephemeris information comprises at least one first ephemeris information, and the first ephemeris information group has the first association relationship with the first information; and
wherein the at least one set of ephemeris information comprises a second ephemeris information group, the second ephemeris information group comprises at least one second ephemeris information, and the second ephemeris information group has a second association relationship with the first information.

8. The terminal device according to claim 7, wherein the first information comprises at least one of:

time information, ephemeris information format, group identifier, reference signal index, cell identifier, antenna polarization mode, satellite identifier, serving satellite, service duration of serving satellite, satellite to provide service, time when satellite to provide service starts service, the service duration of satellite to provide service, satellite to not provide service, and time when satellite to not provide service stops service.

9. The terminal device according to claim 7, wherein the synchronization assistance information is used to determine at least one of:

ephemeris information, common timing advance TA value, common TA value change information, common frequency offset value, common frequency offset value change information, terminal device position information, and reference point information; wherein, the ephemeris information is used to determine at least one of satellite position information or satellite velocity information.

10. A network device, comprising:

a processor and a memory, the memory being configured to store a computer program, which when executed by the processor, causes the network device to:

send synchronization assistance information, wherein the synchronization assistance information has a first association relationship with first information;

wherein the synchronization assistance information is used to enable a terminal device to acquire synchronization;

wherein the synchronization assistance information comprises at least one set of ephemeris information, a first ephemeris information group in the at least one set of ephemeris information comprises at least one first ephemeris information, and the first ephemeris information group has the first association relationship with the first information; and wherein the at least one set of ephemeris information comprises a second ephemeris information group, the second ephemeris information group comprises at least one second ephemeris information, and the second ephemeris information group has a second association relationship with the first information.

11. The network device according to claim 10, wherein the first information comprises at least one of:

time information, ephemeris information format, group identifier, reference signal index, cell identifier, antenna polarization mode, satellite identifier, serving satellite, service duration of serving satellite, satellite to provide service, time when satellite to provide service starts service, the service duration of satellite to provide service, satellite to not provide service, and time when satellite to not provide service stops service.

12. The network device according to claim 10, wherein the synchronization assistance information is used to determine at least one of:

ephemeris information, common timing advance TA value, common TA value change information, common frequency offset value, common frequency offset value change information, terminal device position information, and reference point information; wherein, the ephemeris information is used to determine at least one of satellite position information or satellite velocity information.

13. The network device according to claim 10, wherein the second association relationship is obtained through at least one of system message, handover command, RRC signaling, MAC CE and DCI; or the second association relationship is obtained according to a predefined rule.

14. The network device according to claim 10, wherein the at least one piece of first ephemeris information comprised in the first ephemeris information group and the at least one piece of second ephemeris information comprised in the second ephemeris information group correspond to a same time.

15. The network device according to claim 10, wherein the first association relationship is obtained through at least one of system message, handover command, RRC signaling, MAC CE and DCI; or the first association relationship is obtained according to a predefined rule.

* * * * *